United States Patent
Kim (10) Patent No.: US 12,449,001 B2
(45) Date of Patent: Oct. 21, 2025

(54) HYBRID THRUST FOIL BEARING

(71) Applicant: Board of Regents, The University of Texas System, Austin, TX (US)

(72) Inventor: Daejong Kim, Arlington, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 47 days.

(21) Appl. No.: 18/405,545

(22) Filed: Jan. 5, 2024

(65) Prior Publication Data

US 2024/0229861 A1 Jul. 11, 2024

Related U.S. Application Data

(60) Provisional application No. 63/437,516, filed on Jan. 6, 2023.

(51) Int. Cl.
*F16C 17/04* (2006.01)
*F16C 32/06* (2006.01)

(52) U.S. Cl.
CPC ........ *F16C 17/042* (2013.01); *F16C 32/0622* (2013.01)

(58) Field of Classification Search
CPC .......................... F16C 17/042; F16C 32/0622
See application file for complete search history.

(56) References Cited

U.S. PATENT DOCUMENTS

| 8,500,331 B2 * | 8/2013 | Kim .................... | F16C 32/0685 |
| | | | 384/106 |
| 9,976,595 B2 * | 5/2018 | Kim .................... | F16C 32/0622 |
| 2011/0033142 A1 * | 2/2011 | Kim .................... | F16C 17/024 |
| | | | 384/106 |
| 2017/0051788 A1 * | 2/2017 | Kim .................... | F16C 32/0622 |

FOREIGN PATENT DOCUMENTS

WO WO-2020126430 A1 * 6/2020 ............ F16C 17/243

OTHER PUBLICATIONS

Machine Translation of WO-2020126430-A1 (Year: 2020).*
LaTray et al., "Static Performance of a Hydrostatic Thrust Foil Bearing for Large Scale Oil-Free Turbomachines", Journal of Engineering for Gas Turbines and Power, vol. 143, 2021, pp. 041017-1-041017-9, URL: http://asmedigitalcollection.asme.org/gasturbinespower/article-pdf/143/4/041017/6646843/gtp_143_04_041017.pdf by University of Texas at Arlington user on May 20, 2021.

* cited by examiner

*Primary Examiner* — Alan B Waits
(74) *Attorney, Agent, or Firm* — Maynard Nexsen PC; John P. Zimmer; Nicholas P. Stadnyk (57) ABSTRACT

According to some embodiments, a hybrid thrust foil bearing is provided. A thrust foil bearing or hybrid thrust foil bearing can comprise a disc-shaped backing plate and a bearing pad attached to the backing plate, the bearing pad having a taper portion and a flat portion, the taper portion extending from a leading edge of the bearing pad to a first angular distance and the flat portion extending from the first angular distance to a trailing edge at a second angular distance. Further, the bearing pad can comprise a bump foil coupled to the plate and a top foil disposed over the bump foil, a first edge of the top foil coupled to the backing plate at the leading edge. Additionally the bearing pad can comprise at least one orifice in the taper portion.

20 Claims, 8 Drawing Sheets

HYBRID THRUST FOIL BEARING

CROSS-REFERENCE TO RELATED APPLICATIONS

This application claims priority pursuant to 35 U.S.C. § 119(e) to U.S. Provisional Patent Application Ser. No. 63/437,516, filed on Jan. 6, 2023, which is hereby incorporated by reference in its entirety.

FIELD

The technology described herein generally relates to thrust bearings, and more specifically to hybrid thrust foil bearings having improved mechanical properties.

BACKGROUND

Conventional or previous hydrostatic thrust foil bearings generally have flat bearing surfaces, and having only a flat surface, the bearing works with only hydrostatic injection and does not have any capabilities to generate hydrodynamic, or self-acting, load capacity. Other previous hybrid foil bearings incorporate a Rayleigh step geometry on the bearing surface and incorporating a bearing on a high flat surface portion of the step geometry. However, the Rayleigh step geometry for foil bearings generally have a lower load capacity than a conventional hydrodynamic foil bearing, and additionally the Rayleigh step geometry bearings with hydrostatic injection at a high flat surface portion do not boost load capacity much once the speed of the bearing is high during operation and/or the bearing is highly loaded.

Accordingly, the technology described herein provides improvements over conventional thrust foil bearings, specifically by incorporating both hydrostatic and hydrodynamic thrust foil bearing features to provide a hybrid thrust foil bearing.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the technology described herein are generally directed towards thrust bearing (or foil thrust bearing or hybrid foil thrust bearing) for reducing friction while employed in an application and/or for supporting axial loads. Additionally, embodiments of the technology provide improved thrust foil bearings, for instance to increase the load capacity of a thrust foil bearing by utilizing both hydrostatic and hydrodynamic features to provide a hybrid thrust foil bearing.

According to some embodiments, a hybrid thrust foil bearing is provided. A thrust foil bearing or hybrid thrust foil bearing can comprise a disc-shaped backing plate and a bearing pad attached to the backing plate, the bearing pad having a taper portion and a flat portion, the taper portion extending from a leading edge of the bearing pad to a first angular distance and the flat portion extending from the first angular distance to a trailing edge at a second angular distance. Further, the bearing pad can comprise a bump foil coupled to the plate and a top foil disposed over the bump foil, a first edge of the top foil coupled to the backing plate at the leading edge. In some embodiments, the bearing pad can comprise at least one orifice in the taper portion. In some other embodiments, the bearing pad can comprise one or more orifice(s) beyond the taper portion or region, for example in the flat portion or region. In some aspects, the bearing pad can comprise one or more orifices in the flat region if the speed of the application is not very high and/or a high injection pressure is available.

Additional objects, advantages, and novel features of the technology will be set forth in part in the description which follows, and in part will become apparent to those skilled in the art upon examination of the following, or can be learned by practice of the invention.

BRIEF DESCRIPTION OF THE DRAWINGS

Aspects of the technology presented herein are described in detail below with reference to the accompanying drawing figures, wherein.

DETAILED DESCRIPTION

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps disclosed herein unless and except when the order of individual steps is explicitly described.

Accordingly, embodiments described herein can be understood more readily by reference to the following detailed description, examples, and figures. Elements, apparatus, and methods described herein, however, are not limited to the specific embodiments presented in the detailed description, examples, and figures. It should be recognized that the exemplary embodiments herein are merely illustrative of the principles of the invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" or "5 to 10" or "5-10" should generally be considered to include the end points 5 and 10.

Further, when the phrase "up to" is used in connection with an amount or quantity; it is to be understood that the amount is at least a detectable amount or quantity. For example, a material present in an amount "up to" a specified amount can be present from a detectable amount and up to and including the specified amount.

Additionally, in any disclosed embodiment, the terms "substantially," "approximately," and "about" may be substituted with "within [a percentage] of" what is specified, where the percentage includes 0.1, 1, 5, and 10 percent.

According to embodiments of the present technology, a hybrid thrust foil bearing is provided, where the hybrid thrust foil bearing incorporates aspects of hydrostatic bearings and hydrodynamic bearings. In some instances, a hybrid thrust foil bearing incorporates one or more bearing pads attached to a backing plate, where each of the one or more bearing pads incorporates a taper portion and a flat portion, where each taper portion of the one or more bearing pads can further incorporate one or more orifices in the taper portion. The backing plate having the one or more bearing pads can be contained within a housing. The orifice(s) can be further configured such that an orifice tube can attach to the orifices (or orifice holes) at a determined point, such as a top foil of the bearing pad, and extend into the housing for connection with an external air source. In some other embodiments, the bearing pad can comprise one or more orifice(s) beyond the taper portion or region, for example in the flat portion or region. In some aspects, the bearing pad can comprise one or more orifices in the flat region if the speed of the application is not very high and/or a high injection pressure is available As will be appreciated, hybrid thrust bearings in accordance with the present technology can be configured to significantly increase the load capacity of the thrust foil bearing by incorporating or otherwise combining or incorporating aspects of hydrostatic injection with hydrodynamic thrust foil bearing features.

In some instances, an external injection orifice can be incorporated at about 30% of a top foil pad angle (that is the total angular distance from a leading edge of the bearing pad). In some other instances, the bearing pad, or more specifically, the top foil contour is taper-flat (e.g. 50% taper region or portion and 50% flat region or portion). Additionally, one or more orifices can be incorporated into the bearing pad, for instance in the taper portion or region, and located at any suitable location not inconsistent with the objectives of the technology, for instance one or more orifices can be located on a bearing pad towards the end of the taper region or portion away from a leading edge, or further one or more orifices can be located in the flat region or portion, at any suitable location not inconsistent with the technical objectives of the present technology. Without intending to be bound by theory, the combination of taper-flat geometry and the positioning of one or more orifices incorporated into the bearing pads ensure the bearing's boost effect regardless of the speed of the bearing or the loading conditions. Furthermore, without intending to be bound by theory, one or more orifices located in the flat region or portion can provide improved load capacity, for instance at low speed operation or during startup.

Figure 1:
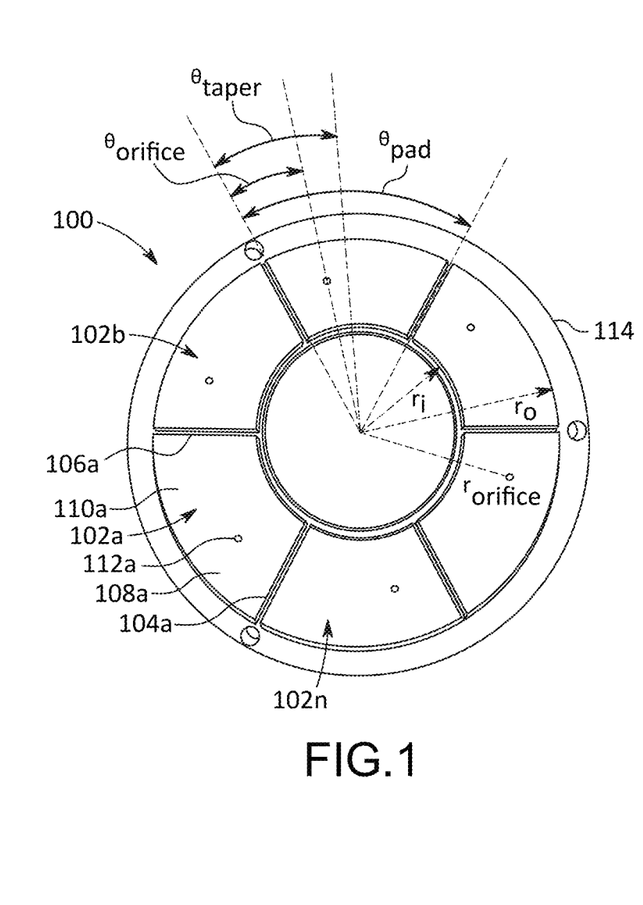
FIG. 1 illustrates an example hybrid thrust foil bearing, in accordance with some aspects of the technology described herein.

According to various embodiments, a hybrid thrust foil bearing can incorporate external injection orifices to a taper-flat hydrodynamic thrust foil to produce a hybrid load capacity, i.e. a hydrodynamic effect as well as external pressurization (hydrostatic features) regardless of a speed range for the hybrid thrust foil bearing. Referring now to FIG. 1, FIG. 1 shows a depiction of a hybrid thrust foil bearing and associated geometry. In FIG. 1, the hybrid thrust foil bearing has six bearing pads, however, it will be appreciated that any number not inconsistent with the technology may be incorporated. In FIG. 1, the hybrid thrust foil bearing has a leading edge (LE) and a trailing edge (TE). The bearing pad in some instances comprises a bump foil and a top foil. The bump foil in some instances can cover 50% or more of the entire bearing surface. In some further instances, the bump height gradually increases in the taper region and then becomes uniform in the flat surface portion or region. Additionally, a bearing pad of the hybrid thrust foil bearing can include one or more orifices, which can be located in the taper region of the bearing surface, for example an orifice can be located at about 30% of the entire top foil pad angle. In some embodiments, the top foil contour or geometry is taper flat at about 50% taper of the total bearing pad distance and/or angle and about 50% flat of the total bearing pad distance and/or angle. As will be appreciated, FIG. 1 illustrates an example hybrid thrust foil bearing with six pads (in some instances referred to as top foils) with at least one orifice in the taper region (also referred to in some instances as an injection orifice). As illustrated in FIG. 1 a hybrid thrust foil bearing can comprise a plurality of pads or bearing pads 102*a*, 102*b*, 102*n*, for instance distributed on a backing plate 114. A bearing pad can comprise a leading edge 104a and a trailing edge 106a. The bearing pads 102a, 102b, 102n can be spaced on the backing plate in any manner not inconsistent with the technical objectives of the present technology. In some instances, there can be a space between the trailing edge of a first bearing pad (e.g. bearing pad 102a) and the leading edge of a second bearing pad (e.g. bearing pad 102b). A bearing pad 102a, 102b, 102n can further comprise a taper portion or region 108a and a flat portion or region 110a. A bearing pad can have an angular distance of $\theta_{pad}$ across the backing plate. Any angular distance of a bearing pad not inconsistent with the technical objectives of the present technology may be used. In some instances, an angular distance of one or more bearing pads can be determined based on the number of bearing pads 102n of the hybrid thrust foil bearing. The taper portion or region of a bearing pad (e.g. bearing pad 102a) can extend from the leading edge (e.g. 104a) to a first angular distance ($\theta_{taper}$) and the flat portion or region of the bearing pad can extend from the first angular distance to a trailing edge at a second angular distance ($\theta_{pad}$). Any angular distance for the first angular distance ($\theta_{taper}$) can be used not inconsistent with the technical objectives of the present technology. For example, the first angular distance can be up to 60% of the bearing pad angular distance $\theta_{pad}$ (e.g. the second angular distance), up to 50% of the bearing pad angular distance, up to 40% of the bearing pad angular distance, up to 30% of the bearing pad angular distance, or up to 20% of bearing pad angular distance. In some further embodiments, the bearing pad comprises a flat portion extending from the leading edge (e.g. leading edge 104a) to the taper portion. In some embodiments, the taper portion (e.g. 108a) is about 50% of the bearing pad and the flat portion (e.g. 110a) is about 50% of the bearing pad.

In some embodiments, a bearing pad 102a, 102b, 102n can comprise an orifice 112a, or a plurality of orifices. In some instances, an orifice 112a can be located on the taper portion or region 108a of a bearing pad (e.g. 102a). In some other instances, an orifice can be located on the flat portion or region of a bearing pad. In some embodiments, the orifice can be located at an angular distance ($\theta_{orifice}$) of between about 10% and about 50% of the second angular distance (e.g. $\theta_{pad}$), at an angular distance of between about 15% and about 45% of the second angular distance, at an angular distance of between about 20% and about 30% of the second angular distance, at an angular distance of between about 10% and about 30% of the second angular distance, at an angular distance of between about 10% and about 20% of the second angular distance, or at an angular distance of up to about 45% of the second angular distance, up to about 30% of the second angular distance, up to about 25% of the second angular distance, or up to about 20% of the second angular distance.

In some embodiments, a bearing pad can have an inner radius ($r_i$) and an outer radius ($r_o$) from the center of the hybrid thrust foil bearing. Additionally, an orifice can have an orifice radius ($r_{orifice}$) from the center of the hybrid thrust foil bearing. Any $r_i$, $r_o$, and/or $r_{orifice}$ can be used not inconsistent with the technical objectives of the present technology.

Figure 2:
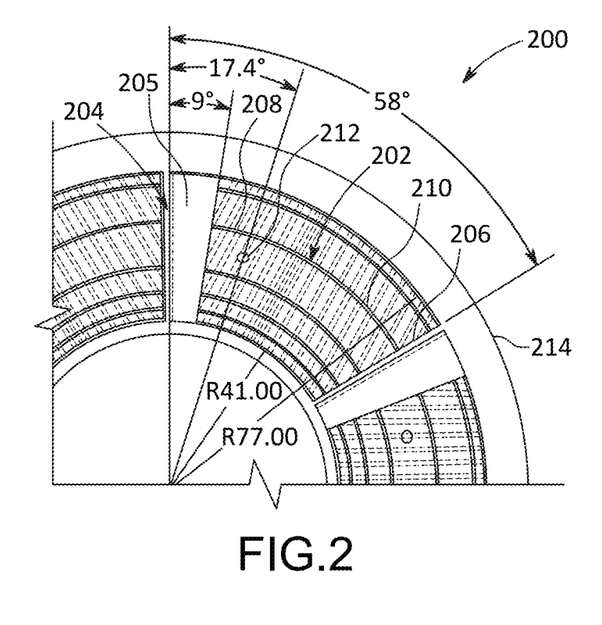
FIG. 2 illustrates an example hybrid thrust foil bearing geometry, in accordance with some aspects of the technology described herein.

Referring now to FIG. 2, illustrates a portion of an example hybrid thrust foil bearing showing an example geometry of the portion of the hybrid thrust foil bearing 200, more particularly bearing pad 202 affixed to backing plate 214. As shown, bearing pad 202 can comprise an orifice 212 at a location of about 30% (i.e. $\theta_{orifice}$=~17.4° from LE) of the entire or total pad angle (i.e. angle $\theta_{pad}$=) 58°. In the illustrated example geometry, the bearing pad 202 geometry further comprises a flat portion 205 extending from the leading edge (e.g. leading edge 204) to a taper portion 208, and a flat portion 210. In some instances, the flat portion 205 can extend to about 15% of the entire or total pad angle (i.e. $\theta_{flat}$=~9°). In some embodiments, one or more orifices can be located at a location over 50% of the pad angle, for instance in some embodiments on the flat region or portion. As will be appreciated, in some embodiments, one or more orifices can be located in the taper portion or region and/or the flat portion or region. Any number of orifices not inconsistent with the technical objectives of the present technology can be incorporated into one or more bearing pads of a hybrid thrust foil bearing.

Figure 3A:
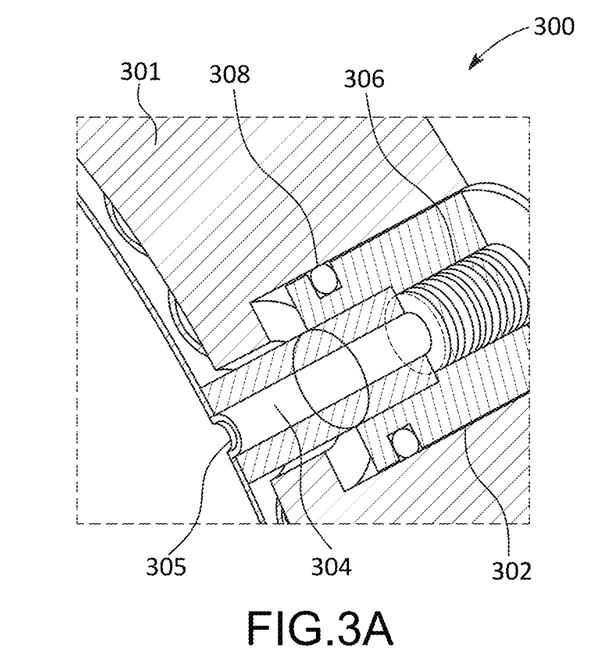
FIG. 3A illustrates an example orifice connection method for a hybrid thrust foil bearing, in accordance with some aspects of the technology described herein.
Figure 3B:
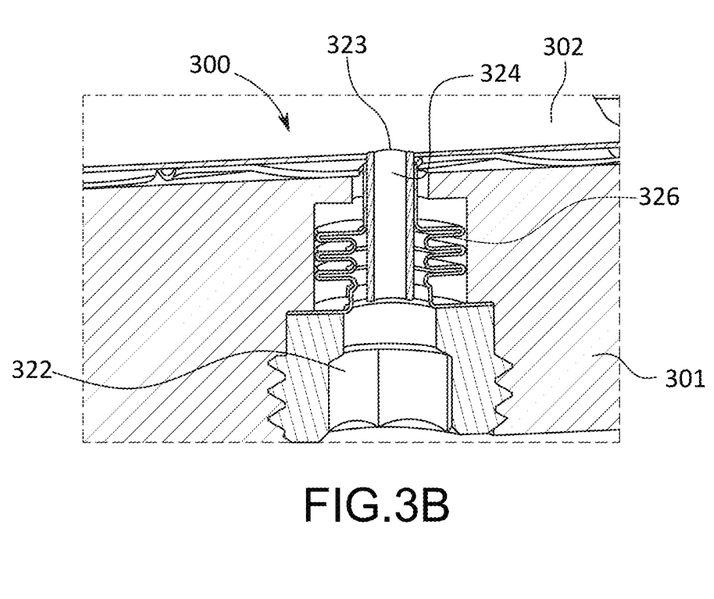
FIG. 3B illustrates an example orifice connection method for a hybrid thrust foil bearing, in accordance with some aspects of the technology described herein

Referring now to FIG. 3A, FIG. 3A illustrates one example orifice connection feature 300 or method applicable for connecting an orifice 305 in a hybrid thrust foil bearing to an external air source via a housing 301. In some aspects, orifice connection feature 300 can be implemented as a plug configuration 302. Orifice connection feature 300 can comprise an orifice tube 304, which in some instances comprises a thread on the outside diameter. Further, in some instances, orifice connection feature can comprise a plug with a thread on the inside diameter 306. In some instances, orifice connection feature 300 can comprise an o-ring 308. Looking at FIG. 3B, another example orifice connection feature 300 is illustrated. Orifice connection feature can extend from orifice 323 into housing 301. Orifice connection feature 300 can comprise an orifice tube 324 that can be welded to top foil 302. Orifice connection feature 300 in some instances can comprise a bellows 326 in a sleeve. In some instances, orifice connection feature 300 can further comprise a set screw 322 with a through hole.

Figure 4A:
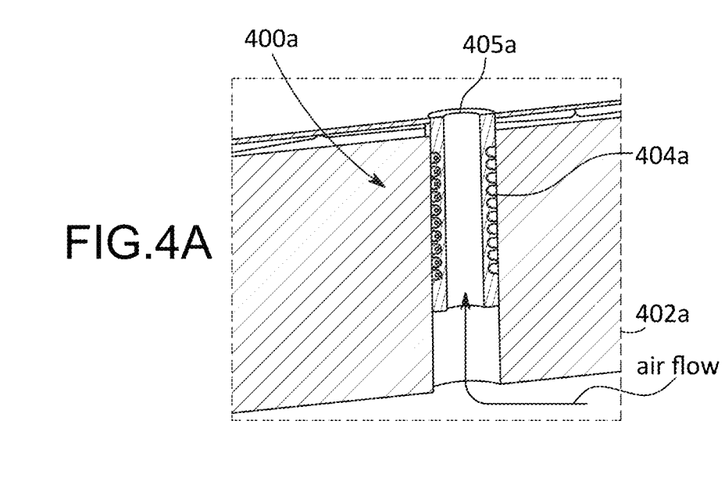
FIG. 4A illustrates an example alternate orifice connection method for a hybrid thrust foil bearing, in accordance with some aspects of the technology described herein.
Figure 4B:
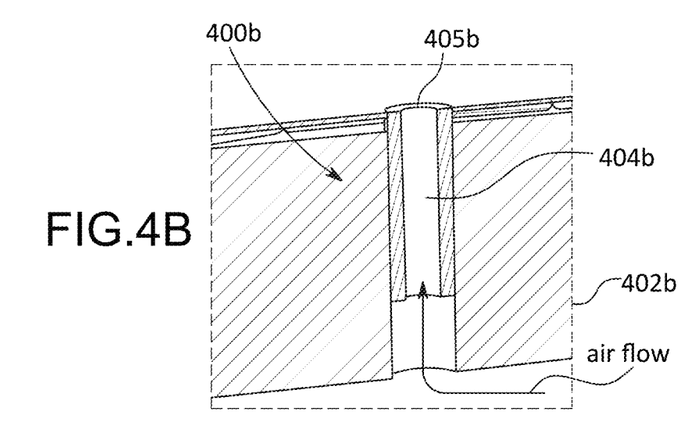
FIG. 4B illustrates an example alternate orifice connection method for a hybrid thrust foil bearing, in accordance with some aspects of the technology described herein.
Figure 4C:
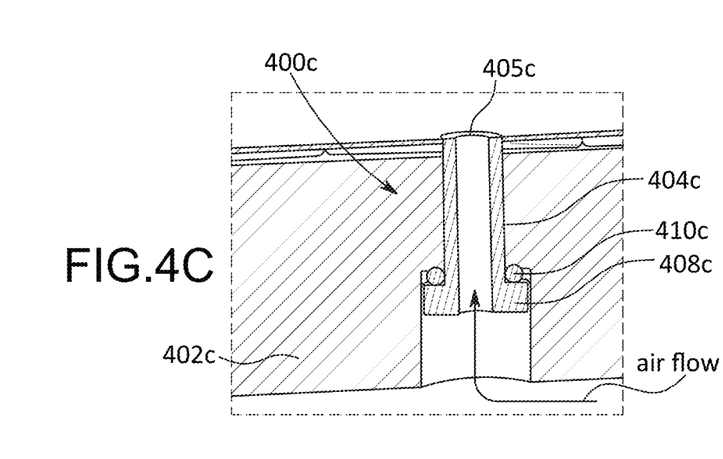
FIG. 4C illustrates an example alternate orifice connection method for a hybrid thrust foil bearing, in accordance with some aspects of the technology described herein.
Figure 4D:
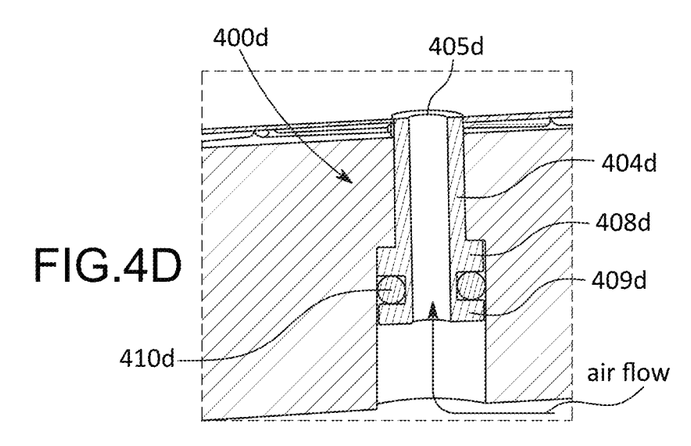
FIG. 4D illustrates an example alternate orifice connection method for a hybrid thrust foil bearing, in accordance with some aspects of the technology described herein.

Turning to FIG. 4A-4D other orifice connection features 400a, 400b, 400c, 400d, or methods are illustrated. Accordingly, the connection methods illustrated in FIGS. 4A and 4B allow the orifice tubes to slides into holes in the housing (or external housing) a with a small gap restricting any leakage (e.g. air leakage) through these gaps. The connection methods illustrated in FIGS. 4C and 4D, however, do not allow any leakage. As illustrated, FIG. 4A depicts a connection mechanism where an orifice tube 404a extends from orifice 405a into housing 402a, and comprises a plurality of labyrinth seal teeth on the outside surface of the orifice tube 404a. FIG. 4B depicts a connection mechanism where the orifice tube 404b extends from orifice 405b into housing 402b and is smooth and there is a uniform gap between the orifice tube 404b and the housing 402b. FIG. 4C depicts a orifice connection feature or connection mechanism 400c where the orifice tube 404c extends from orifice 405c into housing 402c and comprises a flange portion 408c that is configured to compress an o-ring 410c between the flange portion 408c and the housing 402c. FIG. 4D depicts a orifice connection feature connection mechanism 400d that extends from orifice 405d into housing 402d where the orifice tube 404d comprises a first flange 408d and a second flange 409d, wherein an o-ring 410d is positioned between the first flange 408d and the second flange 409d, and the housing 402d is configured to hold the orifice tube in place.

Figure 5A:
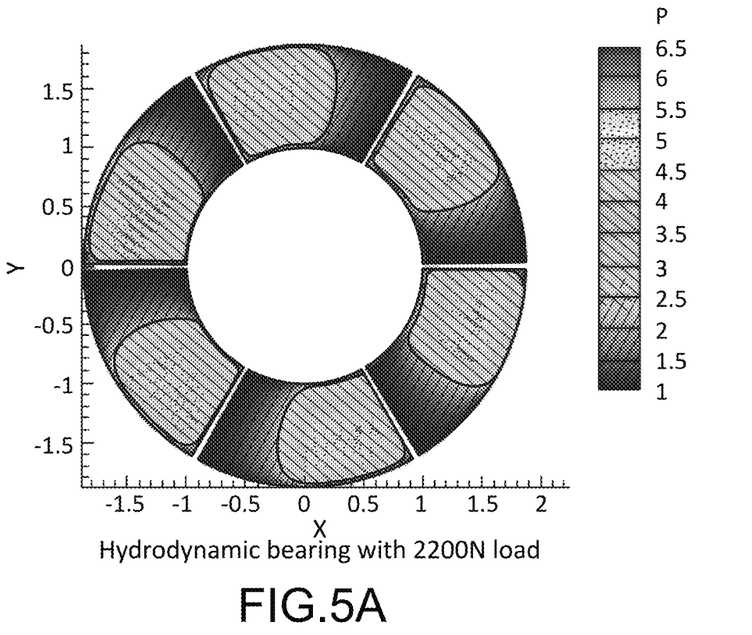
FIGS. 5A and 5B show schematics illustrating predicted pressure at 40 krpm with the same operating clearance between a conventional bearing and a hybrid thrust foil bearing, in accordance with some aspects of the technology described herein.
Figure 5B:
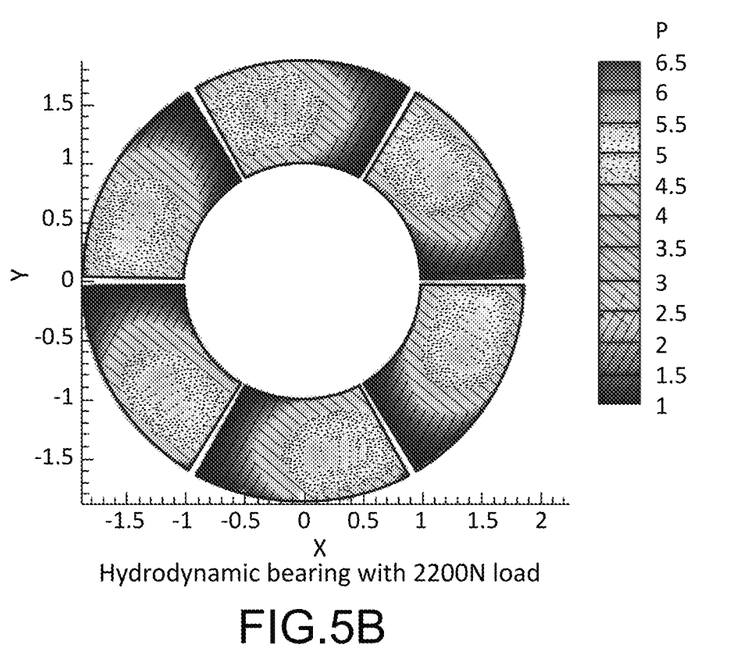

Referring to FIGS. 5A and 5B, FIG. 5A illustrates predicted pressures for a hydrodynamic bearing with a 2200 N load and FIG. 5B illustrates predicted pressures for a hybrid thrust foil bearing with a 3000N load, where the predicted pressure is at 40 krpm and each bearing has the same operating clearance.

Figure 6:
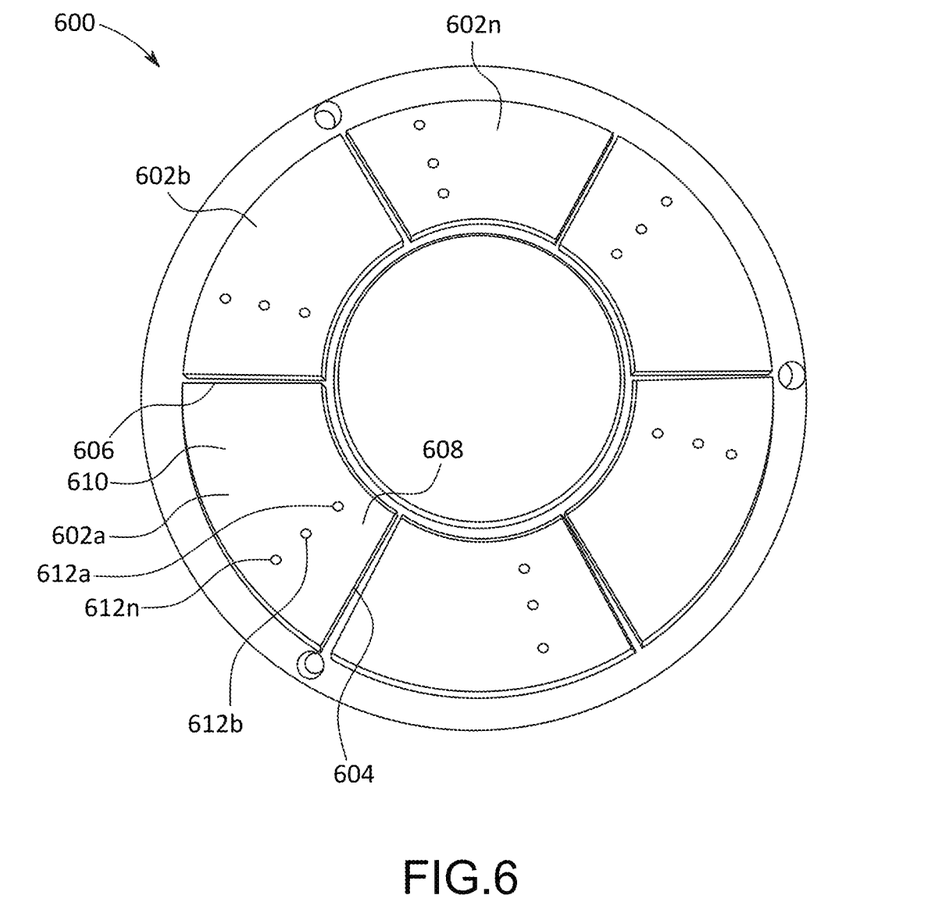
FIG. 6 illustrates an example hybrid thrust foil bearing, in accordance with some aspects of the technology described herein.

Referring now to FIG. 6, FIG. 6 illustrates a hybrid thrust foil bearing 600 having six pads 602a, 602b, 602n, and three orifices in the taper portion (e.g. 608) of each pad, for example orifices 612a, 612b, 612n in bearing pad 602a. As discussed herein, a bearing pad 602a can comprise a leading edge 604 and a trailing edge 606 and a flat portion 610. As illustrated, in some embodiments, orifices 612a, 612b, 612n can be located at the same angular distance from the leading edge of a given bearing pad (e.g. 602a). In some other embodiments, orifices 612a, 612b, 612n can be located at different angular distances from the leading edge of a given bearing pad (e.g. 602a). In some instances, orifices 612a, 612b, 612n can be located in the taper portion or region 608 of a bearing pad or located in the flat portion or region 610 of the bearing pad.

Figure 7A:
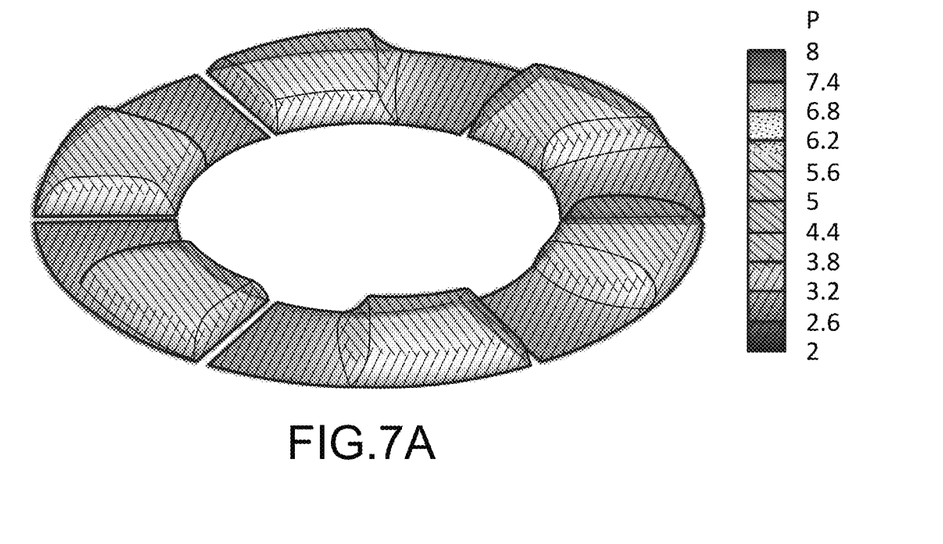
FIG. 7A illustrates hydrodynamic pressure of an example hybrid thrust foil bearing, in accordance with some aspects of the technology described herein.
Figure 7B:
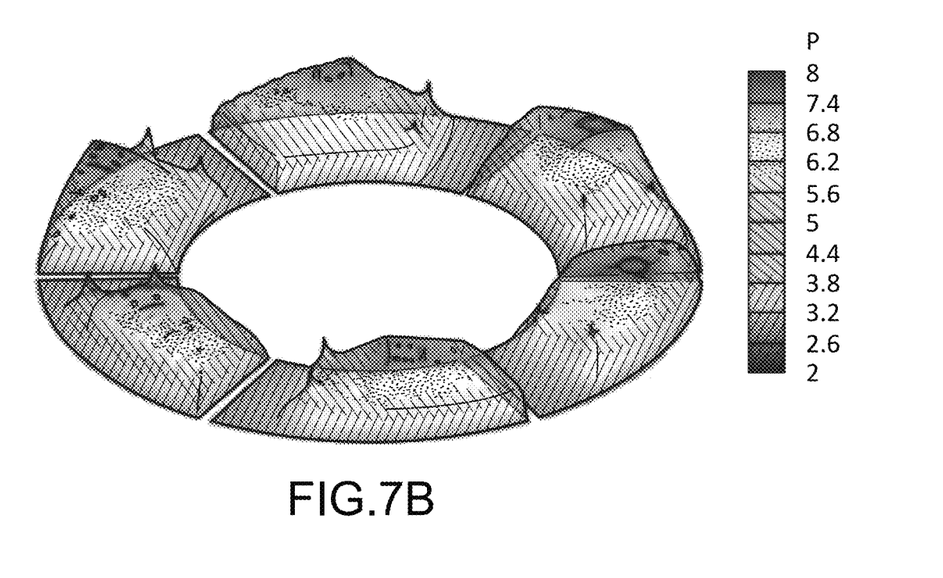
FIG. 7B illustrates boosted hydrodynamic pressure of an example hybrid thrust foil bearing due to injection pressure, in accordance with some aspects of the technology described herein.

Referring to FIGS. 7A and 7B, FIGS. 7A and 7B illustrate example three-dimensional pressure distributions for a hybrid thrust foil bearing with two orifices per pad, as can be seen hydrodynamic pressure comes from the taper-feature of the thrust foil bearing (FIG. 7A) and boosted due to injection pressures via the orifice(s) (FIG. 7B).

As will be appreciated, a hybrid thrust foil bearing as provided herein, can in some example instances find application in air-compressors, micro gas turbine generators, ORC turbo expanders, natural gas pressure let-down turbo expanders, refrigerant turbo compressors, amongst other applications.

Figure 8:
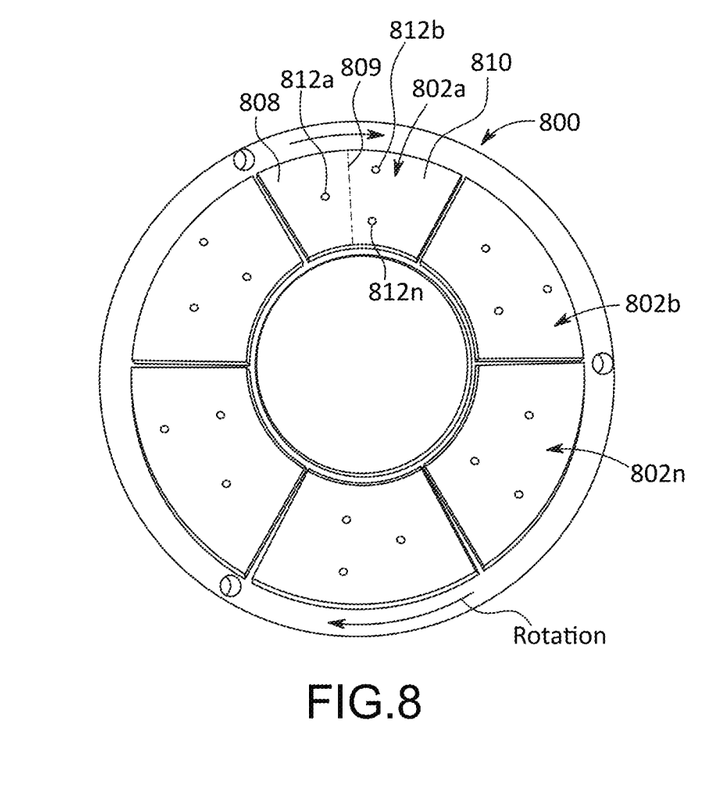
FIG. 8 illustrates an example hybrid thrust foil bearing, in accordance with some aspects of the technology described herein.

Referring now to FIG. 8, an example hybrid thrust foil bearing 800 is illustrated comprising a plurality of bearing pads 802a, 802b, 802n, where each bearing pad comprises plurality of orifices 812a, 812b, 812n. As illustrated in this example, a bearing pad can comprise one orifice 812a in the taper portion or region 808 and two orifices 812b, 812n in the flat portion or region 810. As will be appreciated a bearing pad can comprise a taper portion and a flat portion divided by taper-flat boundary 809. Taper-flat boundary can be located at any angular distance of a bearing pad, for example up to 50% of the total angular distance of the bearing pad.

Figure 9:
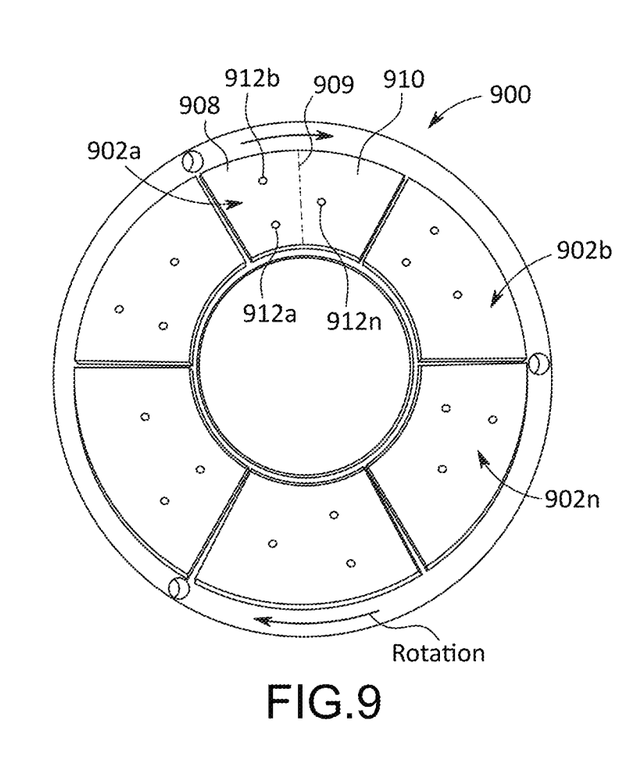
FIG. 9 illustrates an example hybrid thrust foil bearing, in accordance with some aspects of the technology described herein.

Referring now to FIG. 9, an example hybrid thrust foil bearing 900 is illustrated comprising a plurality of bearing pads 902a, 902b, 902n, where each bearing pad comprises plurality of orifices 912a, 912b, 912n. As illustrated in this example, a bearing pad can comprise two orifices 812a, 812b in the taper portion or region 908 and one orifice 812n in the flat portion or region 910. As will be appreciated a bearing pad can comprise a taper portion and a flat portion divided by taper-flat boundary 909. Taper-flat boundary can be located at any angular distance of a bearing pad, for example up to 50% of the total angular distance of the bearing pad.

Figure 10:
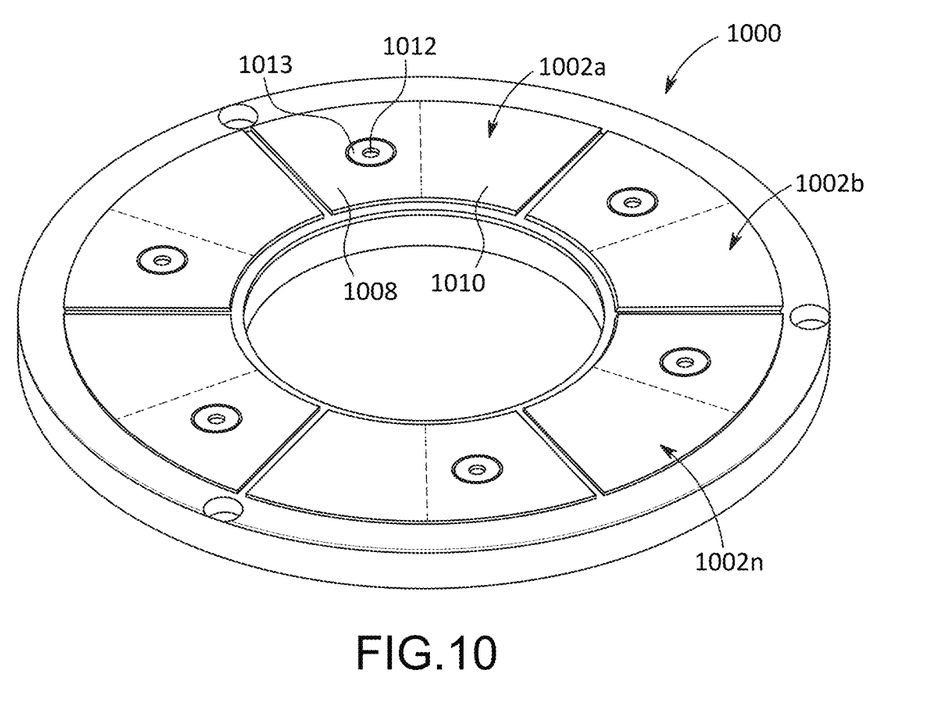
FIG. 10 illustrates an example hybrid thrust foil bearing, in accordance with some aspects of the technology described herein.

Turning to FIG. 10, an example hybrid thrust foil bearing 1000 is illustrated comprising a plurality of bearing pads 1002a, 1002b, 1002n. A bearing pad can comprise a taper portion or region 1008 and a flat portion or region 1010. As will be appreciated a bearing pad can comprise a taper portion and a flat portion divided by taper-flat boundary 1009. Taper-flat boundary can be located at any angular distance of a bearing pad, for example up to 50% of the total angular distance of the bearing pad In some embodiments, a bearing pad can comprise an orifice 1012, which can in some instances can be surround by a pocket 1013. As will be appreciated, a pocket of any size, shape, and/or depth not inconsistent with the technical objectives of the present technology may be implemented. Further, FIG. 10 illustrates hybrid thrust foil bearing 1000 comprising one or more bearing pads 1002a, 1002b, 1002n affixed to backing plate 1016 and further attached to housing 1014.

Additional Embodiments

Some additional, non-limiting, example embodiments are provided below.

Embodiment 1. A thrust foil bearing comprising: a disc-shaped backing plate; and a bearing pad attached to the backing plate, the bearing pad having a taper portion and a flat portion, the taper portion extending from a leading edge of the bearing pad to a first angular distance and the flat portion extending from the first angular distance to a trailing edge at a second angular distance, wherein the bearing pad comprises a bump foil coupled to the plate and a top foil disposed over the bump foil, a first edge of the top foil coupled to the backing plate at the leading edge, and wherein the bearing pad comprises at least one orifice in the taper portion.

Embodiment 2. The thrust foil bearing of embodiment 1, wherein the taper portion is about 50% of the bearing pad and the flat portion is about 50% of the bearing pad.

Embodiment 3. The thrust foil bearing of any of the preceding embodiments comprising a plurality of bearing pads.

Embodiment 4. The thrust foil bearing of any of the preceding embodiments wherein one or more bump foils cover over 50% of the backing plate.

Embodiment 5. The thrust foil bearing of any of the preceding embodiments wherein the orifice is located at an angular distance of between about 15% to about 45% of the second angular distance or between about 15% to about 45% of a bearing pad angle or total bearing pad angle.

Embodiment 6. The thrust foil bearing of any of the preceding claims wherein the orifice is located at an angular distance of about 30% of the second angular distance or about 30% of the bearing pad angle or total bearing pad angle.

Embodiment 7. The thrust foil bearing of any of the preceding embodiments, wherein the bump foil supports the top foil only in the flat portion.

Embodiment 8. The thrust foil bearing of any of the preceding embodiments wherein the bump foil supports the top foil in the flat portion and at least a part of the taper portion.

Embodiment 9. The thrust foil bearing of any of the preceding embodiments wherein the bearing pad comprises a plurality of orifices in the taper portion Embodiment 10. The thrust foil bearing of any of the preceding embodiments wherein the plurality of orifices are positioned at the same angular distance from the leading edge or at different angular distances from the leading edge.

Embodiment 11. The thrust foil bearing of any of the preceding embodiments where the orifice comprises an orifice opening in the top foil and an orifice tube attached to the top foil and extending though a clearance hole in the bump foil and a clearance hole in the backing plate.

Embodiment 12. The thrust foil bearing of any of the preceding embodiments wherein the orifice is connected to an external air source.

Embodiment 13. The thrust foil bearing of any of the preceding embodiments further comprising a housing wherein the orifice tube extends into a hole in the housing for connection to an external air source.

Embodiment 14. The thrust foil bearing of any of the preceding embodiments, wherein the orifice tube comprises a plurality of labyrinth seal teeth on the outside surface of the orifice tube.

Embodiment 15. The thrust foil bearing of any of the preceding embodiments, wherein the orifice tube is smooth and there is a uniform gap between the orifice tube and the housing.

Embodiment 16. The thrust foil bearing of any of the preceding embodiments, wherein the orifice tube comprises a flange portion and configured to compress an o-ring between the flange portion and the housing.

Embodiment 17. The thrust foil bearing of any of the preceding embodiments wherein the orifice tube a first flange and a second flange, wherein an o-ring is positioned between the first flange and the second flange and the housing is configured to hold the orifice tube in place.

Embodiment 18. The thrust foil bearing of any of the preceding embodiments wherein the external air source provides an air flow into the housing and into the orifice tube.

Many different arrangements of the various components and/or steps depicted and described, as well as those not shown, are possible without departing from the scope of the claims below. Embodiments of the present technology have been described with the intent to be illustrative rather than restrictive. Alternative embodiments will become apparent from reference to this disclosure. Alternative means of implementing the aforementioned can be completed without departing from the scope of the claims below. Certain features and subcombinations are of utility and can be employed without reference to other features and subcombinations and are contemplated within the scope of the claims.

The invention claimed is:

1. A thrust foil bearing comprising:
a disc-shaped backing plate; and
a bearing pad attached to the backing plate, the bearing pad having a taper portion and a flat portion, the taper portion extending from a leading edge of the bearing pad to a first angular distance and the flat portion extending from the first angular distance to a trailing edge at a second angular distance,
wherein the bearing pad comprises a bump foil coupled to the plate and a top foil disposed over the bump foil, a first edge of the top foil coupled to the backing plate at the leading edge, and
wherein the bearing pad comprises at least one orifice in the taper portion, the orifice comprising an orifice opening in the top foil and an orifice tube attached to the top foil and extending though a clearance hole in the bump foil and a clearance hole in the backing plate.

2. The thrust foil bearing of claim 1, wherein the taper portion is about 50% of the bearing pad and the flat portion is about 50% of the bearing pad.

3. The thrust foil bearing of claim 1, comprising a plurality of bearing pads.

4. The thrust foil bearing of claim 3, wherein one or more bump foils cover over 50% of the backing plate.

5. The thrust foil bearing of claim 1, wherein the orifice is located at an angular distance of between about 15% to about 45% of the second angular distance, the second angular distance corresponding to a pad angle.

6. The thrust foil bearing of claim 1, wherein the orifice is located at an angular distance of about 30% of the second angular distance.

7. The thrust foil bearing of claim 1, wherein the bump foil supports the top foil only in the flat portion.

8. The thrust foil bearing of claim 1, wherein the bump foil supports the top foil in the flat portion and at least a part of the taper portion.

9. The thrust foil bearing of claim 1, wherein the bearing pad comprises a plurality of orifices in the taper portion.

10. The thrust foil bearing of claim 9, wherein the plurality of orifices are positioned at the same angular distance from the leading edge.

11. The thrust foil of claim 1, wherein the orifice is connected to an external air source.

12. The thrust foil of claim 1, further comprising a housing wherein the orifice tube extends into a hole in the housing for connection to an external air source.

13. The thrust foil of claim 12, wherein the orifice tube comprises a plurality of labyrinth seal teeth on the outside surface of the orifice tube.

14. The thrust foil of claim 12, wherein the orifice tube is smooth and there is a uniform gap between the orifice tube and the housing.

15. The thrust foil of claim 12, wherein the orifice tube comprises a flange portion and configured to compress an o-ring between the flange portion and the housing.

16. The thrust foil of claim 12, wherein the orifice tube comprises a first flange and a second flange, wherein an o-ring is positioned between the first flange and the second flange and the housing is configured to hold the orifice tube in place.

17. The thrust foil of claim 12, wherein the external air source provides an air flow into the housing and into the orifice tube.

18. The thrust foil of claim 1, wherein a pocket surrounds the at least one orifice.

19. The thrust foil of claim 1, further comprising one or more orifices in the flat portion.

20. The thrust foil of claim 1, further comprising another orifice in the taper portion and an orifice in the flat portion.

* * * * *